United States Patent
Dillon

(10) Patent No.: US 7,917,443 B2
(45) Date of Patent: *Mar. 29, 2011

(54) AUTHENTICATION AND TRACKING SYSTEM

(75) Inventor: David Dillon, Excelsior, MN (US)

(73) Assignee: Verify Brand LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/788,387

(22) Filed: May 27, 2010

(65) Prior Publication Data

US 2010/0268654 A1  Oct. 21, 2010

Related U.S. Application Data

(62) Division of application No. 10/701,377, filed on Nov. 3, 2003, now Pat. No. 7,752,137.

(51) Int. Cl.
G06F 21/00 (2006.01)
G06Q 99/00 (2006.01)
(52) U.S. Cl. .......................... 705/56; 705/318
(58) Field of Classification Search ............... 705/32, 705/56, 318
See application file for complete search history.

(56) References Cited

U.S. PATENT DOCUMENTS

| | | | |
|---|---|---|---|
| 3,833,795 A | 9/1974 | Shoshani et al. |
| 4,463,250 A | 7/1984 | McNeight et al. |
| 4,629,873 A | 12/1986 | Stockburger et al. |
| 4,686,515 A | 8/1987 | Anderson et al. |
| 4,816,824 A | 3/1989 | Katz et al. |
| 5,160,171 A | 11/1992 | Gregory et al. |
| 5,249,044 A | 9/1993 | Von Kohorn |
| 5,267,756 A | 12/1993 | Molee et al. |
| 5,283,422 A | 2/1994 | Storch et al. |
| 5,360,628 A | 11/1994 | Butland |
| 5,367,148 A | 11/1994 | Storch et al. |
| 5,380,047 A | 1/1995 | Molee et al. |
| 5,418,855 A | 5/1995 | Liang et al. |
| 5,517,336 A | 5/1996 | Molee |
| 5,548,110 A | 8/1996 | Storch et al. |
| 5,592,561 A | 1/1997 | Moore |
| 5,762,377 A | 6/1998 | Chamberlain |

(Continued)

FOREIGN PATENT DOCUMENTS

JP  2000-11114 A  1/2000

(Continued)

OTHER PUBLICATIONS

Chen et. al. "Low-Cost RFID Authentication Protocol for Anti-Counterfeiting and Privacy Protection", Asian Journal of Health and Information Sciences, vol. 1, No. 2, pp. 189-203, 2006.*

(Continued)

Primary Examiner — Andrew J. Fischer
Assistant Examiner — Calvin K Cheung
(74) Attorney, Agent, or Firm — Crowell & Moring LLP

(57) ABSTRACT

A subset of unique codes are generated from a set of codes. The subset of codes are stored in a database on a secure server and each of the codes is marked on a corresponding instantiation of the product. The marked instantiations are distributed. During their distribution, the marked instantiations are verified for authenticity and for routing. This verification is performed by reading or scanning the codes on the instantiations, and transmitting that information to the secure server for comparison against the codes and other information located in the database contained therein.

28 Claims, 4 Drawing Sheets

U.S. PATENT DOCUMENTS

| | | | | |
|---|---|---|---|---|
| 5,776,713 | A * | 7/1998 | Garner et al. | 435/7.92 |
| 5,788,669 | A | 8/1998 | Peterson | |
| 5,808,285 | A | 9/1998 | Rockstein et al. | |
| 5,895,073 | A | 4/1999 | Moore | |
| 5,942,444 | A * | 8/1999 | Rittenburg et al. | 436/518 |
| 5,966,205 | A | 10/1999 | Jung et al. | |
| 5,974,150 | A | 10/1999 | Kaish et al. | |
| 5,979,941 | A | 11/1999 | Mosher, Jr. et al. | |
| 5,987,138 | A | 11/1999 | Gilbert et al. | |
| 6,038,016 | A | 3/2000 | Jung et al. | |
| 6,038,334 | A | 3/2000 | Hamid | |
| 6,039,249 | A | 3/2000 | Szewczykowski | |
| 6,069,955 | A | 5/2000 | Coopersmith et al. | |
| 6,119,946 | A | 9/2000 | Teicher | |
| 6,131,718 | A | 10/2000 | Witschorik | |
| 6,212,638 | B1 | 4/2001 | Lee et al. | |
| 6,226,619 | B1 * | 5/2001 | Halperin et al. | 705/23 |
| 6,246,778 | B1 | 6/2001 | Moore | |
| 6,358,607 | B1 | 3/2002 | Grotzner et al. | |
| 6,442,276 | B1 | 8/2002 | Doljack | |
| 6,533,180 | B1 | 3/2003 | Wood | |
| 6,547,137 | B1 | 4/2003 | Begelfer et al. | |
| 6,600,823 | B1 * | 7/2003 | Hayosh | 380/51 |
| 6,662,191 | B1 | 12/2003 | Cherniavsky et al. | |
| 6,681,214 | B1 | 1/2004 | Doljack | |
| 6,788,800 | B1 | 9/2004 | Carr et al. | |
| 6,802,447 | B2 | 10/2004 | Horng | |
| 6,871,789 | B2 | 3/2005 | Hilton et al. | |
| 6,875,105 | B1 * | 4/2005 | Behm et al. | 463/17 |
| 6,935,560 | B2 | 8/2005 | Andreasson et al. | |
| 7,038,766 | B2 | 5/2006 | Kerns et al. | |
| 7,042,335 | B2 | 5/2006 | Franks | |
| 7,097,098 | B2 | 8/2006 | Roberts | |
| 7,175,081 | B2 | 2/2007 | Andreasson et al. | |
| 7,283,630 | B1 | 10/2007 | Doljack | |
| 7,353,994 | B2 * | 4/2008 | Farrall et al. | 235/454 |
| 7,761,347 | B2 * | 7/2010 | Fujisawa et al. | 705/28 |
| 2002/0025490 | A1 * | 2/2002 | Shchegolikhin et al. | 430/270.15 |
| 2002/0038267 | A1 | 3/2002 | Can et al. | |
| 2002/0102008 | A1 | 8/2002 | Dowdy | |
| 2002/0122878 | A1 | 9/2002 | Kerns et al. | |
| 2002/0146146 | A1 | 10/2002 | Miolla et al. | |
| 2002/0178363 | A1 * | 11/2002 | Ambrogio et al. | 713/176 |
| 2003/0141358 | A1 | 7/2003 | Hudson | |
| 2003/0164401 | A1 | 9/2003 | Andreasson et al. | |
| 2003/0179902 | A1 | 9/2003 | Ambrogio et al. | |
| 2004/0034579 | A1 | 2/2004 | Xu et al. | |
| 2004/0086117 | A1 | 5/2004 | Petersen et al. | |
| 2004/0128514 | A1 | 7/2004 | Rhoads | |
| 2004/0172537 | A1 | 9/2004 | Baus et al. | |
| 2004/0205343 | A1 | 10/2004 | Forth et al. | |
| 2005/0151617 | A1 | 7/2005 | Nakazawa | |
| 2005/0261935 | A1 | 11/2005 | Silverbrook et al. | |
| 2005/0261937 | A1 | 11/2005 | Silverbrook et al. | |
| 2005/0261938 | A1 | 11/2005 | Silverbrook et al. | |
| 2005/0264001 | A1 | 12/2005 | Kerns et al. | |
| 2006/0022799 | A1 | 2/2006 | Juels | |
| 2006/0054682 | A1 | 3/2006 | de la Huerga | |
| 2006/0174129 | A1 | 8/2006 | Brignone et al. | |
| 2006/0175401 | A1 | 8/2006 | Roberts | |
| 2006/0181397 | A1 | 8/2006 | Limbachiya | |
| 2006/0237547 | A1 | 10/2006 | Barenburg et al. | |
| 2006/0255130 | A1 | 11/2006 | Whewell et al. | |
| 2007/0012783 | A1 | 1/2007 | Mercolino | |
| 2007/0012784 | A1 | 1/2007 | Mercolino | |
| 2007/0023513 | A1 | 2/2007 | Andreasson et al. | |
| 2007/0198569 | A1 | 8/2007 | Johnston | |

FOREIGN PATENT DOCUMENTS

| | | |
|---|---|---|
| JP | 2005301556 | 10/2005 |
| WO | WO 01/95249 A2 | 12/2001 |
| WO | WO 2005/036504 A1 | 4/2005 |
| WO | WO 2005/083644 A1 | 9/2005 |
| WO | WO 2006/098659 A2 | 9/2006 |

OTHER PUBLICATIONS

Ilic et. al. "Synchronized Secrets Approach for RFID-enabled Anti-Counterfeiting", all pages. <http://www.stop-project.eu/Portals/1/publications/080128_Demo_IoT_v07.pdf>.*

Frederick J. Gravetter and Larry B. Wallnau, "Essentials of Statistics for Behaviorial Sciences", Thompson Wadsworth, 6th Edition, pp. 136-137.*

SNAP! Serial Number Application, Inc. [online], How do Software Companies Effectively Use Serial Numbers? [retrieved on May, 2, 2002] retrieved from the internet http://www.snapinc.com/Pages/faq.html.

Brand Protection—Global Services—De La Rue [online], Track and Trace/SCANet [retrieved on Jun. 12, 2002] retrieved from the internet http:/www.delarue.com'global/bps/technology/portfolio/track/track.asp.

Product Authentication (sphinx system) [online] [retrieved on Feb. 27, 2004] retrieved from the internet www.sphinx-system.com/menu.htm.

AVID identification technology for today and tomorrow [online] [retrieved Jun. 17, 2002] retrieved from the internet http://www.avidplc.com/assetrac/how.htm.

World-Health Organization. Substandard and counterfeit medicines. [retrieved on Dec. 15, 2006] retrieved from the internet http://www.who.Int/mediacentre/factsheets/2003/fs275/en/print.html.

Hopkins, DM, Kontnik, LT and Turnage, MT. Counterfeiting Exposed; Protecting Your Brand and Customers, Chapter 12, "Anticounterfeiting Technology Solutions," pp. 249-262.

Johnston, RG, Tamper detection for safeguards and treaty monitoring: fantasies, realities,and potentials. Nonproliferation Review 2001 Spring: 8 (1); 102-115.

Johnston, RG and Garcia, ARE. An annotated taxonomy of tag and seal vulernabilities. Journal of Nuclear Materials Management 2000 Spring; 229 (3); 23-30.

Johnston, RG. Tamper-indicating seals for nuclear disarmament and hazardous waste management. Science and Global Security 2001; 9 (2); 93-112.

Johnston, RG, Garcia, ARE, and Pacheo, AN. Efficacy of tamper-indicating devices. Journals of Homeland Security Apr. 16, 2002.

Johnston, RG and Garcia, ARE. Analyzing vulnerability results for tag and tamper-indicating seals. Proceedings of the U.S. Army Conference on Applied Statistics; Oct. 24-26, 2001; Santa Fe, NM. pp. 60-88.

Karsten, R. Tags tag counterfeits: as counterfeiting methods become increasingly sophisticated, more advanced technologies are needed to fight back. Manufacturing Chemist Jan. 1, 2003; 73 (1) [retrieved Nov. 11, 2006] retrieved from the internet http://www.manufacturing-chemist.info/story.asp?storyCode-15146.

Kontnik, L. Counterfeits: the cost of combat. Pharmaceutical Executive Nov. 1, 2003 [retrieved Dec. 15, 2006] retrieved from the internet http://www.pharmexec.com/pharmexec/content/printContentPopup.jsp?id=75674.

Software and Media Copy Protection Backgrounder [online] Protected Media [retrieved on Apr. 24, 2002] retrieved from the internet http://www.power-t.com/copy_protect.html.

Tagged Asset Management [online] Tag & Trace Sending Signals for Smarter Business [retrieved on Apr. 24, 2002] retrieved from the internet http://www.climarque.co.uk/passive/seurity.htm.

Heritage and Arts Company Profile [online] Bicode Ltd [retrieved on Feb. 27, 2004] retrieved from the internet http://www.bioscienceyork.org.uk/members/Company_Details.cfm?/CompanyID=1999.

Hitachi, Ltd., Solutions for manufacturing, distribution, tracking, secure ID management and more; Power-Point presentation handout; Feb. 2002.

Codel, Validation Reference (VR) [online] [retrieved on Feb. 27, 2004] retrieved from the internet http://www.authentic1.com/a1/howitworks/vr.htm.

Codel, The VR Tests [online] [retrieved on Feb. 27, 2004] retrieved from the internet http://www.authentic1.com/a1/howitworks/vrtests.htm.

Johnston, R., Vulnerability Assessment Team, Los Alamos National Laboratory, An Anti-Counterfeiting Strategy Using Numeric Tokens, LAUR-04-8055, pp. 1-21.

Ranasighe, Damith C., et al., "Confronting Security and Privacy Threats in Modern RFID Systems", The University of Adelaide Auto-ID Lab, pp. 1-7.

Staake, Thorsten, et al., "Flagship Project Anti-Counterfeiting & Secure Supply Chain", Auto-ID Labs White Paper WP-PP-001, pp. 1-40.

Duc, Dang Nguyen, et al., "Enhancing Secuirty of EPCGlobal Gen-2 RFD Tag Against Traceabiity and Cloning", 2006 symposium on Cryptography and Information Security, Hiroshima, Japan, Jan. 17-20, 2006, pp. 1-6.

Duc, Dan Nguyen, et al., "Enhancing Security of EPCGlobal Gen-2 RFID Tag Against Traceabiity and Cloning", Auto-ID Labs White Paper WP-SWNET-016, pp. 1-11.

"Supply Chain Applications of RFID —Product Packaging", ISO/TC 122/104/JWG N. 05040, ISO/DIS 17366, pp. 1-20.

Laine, S., "Product Authentication with Low-Cost RFID Tags," pp. 1-9.

Menezes et al., Handbook of Applied Cryptography, 1997, p. 175.

Schneier, Bruce, Applied Cryptography: Protocols, Algorithms and Source Code in C, Oct. 1995, pp. 44-45.

Chen, L., et al., "Key Escrow in Mutually Mistrusting Domains," Proceedings of Security Protocols, Mark Lomas (ed.), International Workshop, Cambridge, U.K., (Apr. 10-12, 1996).

Salomaa, Arto, "Public Key Cryptography," Chptr. 1, $2^{nd}$ ed., Springer, (1996).

Schneier, Bruce, "Applied Crytography, Protocols, Algorithms, and Source Code in C," Chptrs. 1, 2, 11, 17, 18, $2^{nd}$ ed., John Wiley & Sons, Inc. (1996).

Simonds, Fred "Network Security, Data and Voice Communications," Chptrs. 10, 12, McGraw-Hill, (1996).

Gustafson, H.M., et al., "Randomness Measures Related to Subject Occurrence," Proceedings of Cryptography: Policy and Algorithms, Ed Dawson, and Jovan Golic (eds.), Brisbane, Queensland, Australia, (Jul. 3-5, 1995).

Bakhtiari, S., et al., "Keyed Hash Functions," Proceedings of Cryptography: Policy and Algorithsm, Ed Dawson and Jovan Golic (eds.), Brisbane, Queensland, Australia, pp. 201-214 (Jul. 3-5, 1995).

Lee, S., et al., "Conditional Correlation Attack on Nonlinear Filter Generators," Proceedings of Advances in Cryptology-ASIACRYPT '96, Kwangjo Kim and Tsutomu Matsumoto (eds.) (Nov. 3-7, 1996).

Visdomine, L., "Breaking VISA PIN", Oct. 17, 2002.

Supplementary European Search Report in Application No. EP 04 81 0322 dated Apr. 11, 2008.

* cited by examiner

AUTHENTICATION AND TRACKING SYSTEM

CROSS REFERENCE TO RELATED APPLICATIONS

This application is a divisional application of Ser. No. 10/701,377, filed Nov. 3, 2003, and is related to U.S. application Ser. No. 10/578,037, filed May 2, 2006 and Ser. No. 11/689,114, filed Mar. 21, 2007, the entire disclosures of which are herein expressly incorporated by reference.

BACKGROUND AND SUMMARY OF THE INVENTION

The invention relates to authentication and tracking systems for products. In particular, the invention relates to systems in which the instantiations of the products are marked with unique code strings.

In the commercial manufacturing world, it is quite common for counterfeit products to be manufactured, distributed, and sold in direct competition with authentic products. Consequently, these counterfeit or "knock off" products cost companies around the world billions of dollars annually in lost sales. Counterfeiting has reached virtually all consumer areas ranging from material goods to pharmaceuticals. Material goods, made from materials such as fabric, plastic, leather, metal, or combinations thereof, include items such as clothing, sporting goods, electronics, and other designer products. While counterfeit material goods closely resemble authentic articles, it is often the case that the counterfeit goods are of lower quality in comparison. As such, the consumer is left frustrated in his expectations, and the manufacturer takes a hit to its reputation. In contrast, counterfeiting of pharmaceuticals, e.g., medicines, presents a health concern for the consumer. For example, in Mexico, estimates suggest that of all the pharmaceuticals in the marketplace, 80% are counterfeit ("Current Trends in Security Labels & Packaging"; Tag and Label Manufacturers Institute Internet website, www.tlmi.com/data/Members/itc.htlm, 2003). Using such counterfeit medications can likely lead to a consumer's death, as the medication may poison the victim or alternatively, provide no aid to what ails the victim. In the end, consumers and manufacturers both suffer from counterfeiting.

In addition to combating counterfeiters in the world market, there exists a need to provide security before products are received into the market. This type of security involves monitoring chains of commerce for the products. For instance, many products, e.g., medicines or sub-components of medicines, may be grown, produced, or assembled in other countries before they are sent to the home country for packaging and distribution. Consequently, it is likely that a number of parties have access to these products as they are passed along the chain of commerce, i.e., during transit. Because of this access, there are many avenues available to counterfeiters. As such, the world market demands product security during the products' distribution along chains of commerce to ensure authenticity for persons such as suppliers, distributors, and retailers.

Further, the illegal "diversion" of the shipment and distribution of authentic products also presents a major problem in modern commerce chains. For example, products manufactured at one location might be subject to controls, such as a tax, if distributed to a second location. Tobacco products, alcoholic beverages, drugs, and a wide variety of other goods and products fall into this category. As such, merchandise may be illegally distributed, diverted, or smuggled into the taxing locations to avoid the tax. Subsequently, the smuggling parties are able to undercut prices of distributors offering the same product who comply and pay the tax.

Similarly, problems may occur when dealing with "gray market" goods, i.e., goods that, while authentically distributed from the legitimate source of the product, have been sold for a certain price overseas and have made their way to a market for which they are not licensed. For example, electronics intended for lower priced markets such as certain Southern Hemisphere countries, may instead be smuggled into the United States. Consequently, the smuggled electronics may be sold at a price less than identical electronics intended for sale in the United States at a higher price. In turn, this practice spoils the manufacturer's global pricing strategies and prevents legitimate distributors from being able to compete.

Thus, there exists a need for a system and method which enable a manufacture to mark goods with encoded data that enables the goods to be readily identified and to be tracked while they are being distributed in the chain of commerce.

Certain embodiments of the invention include methods and systems for authenticating one or more instantiations of a product following initial distribution.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
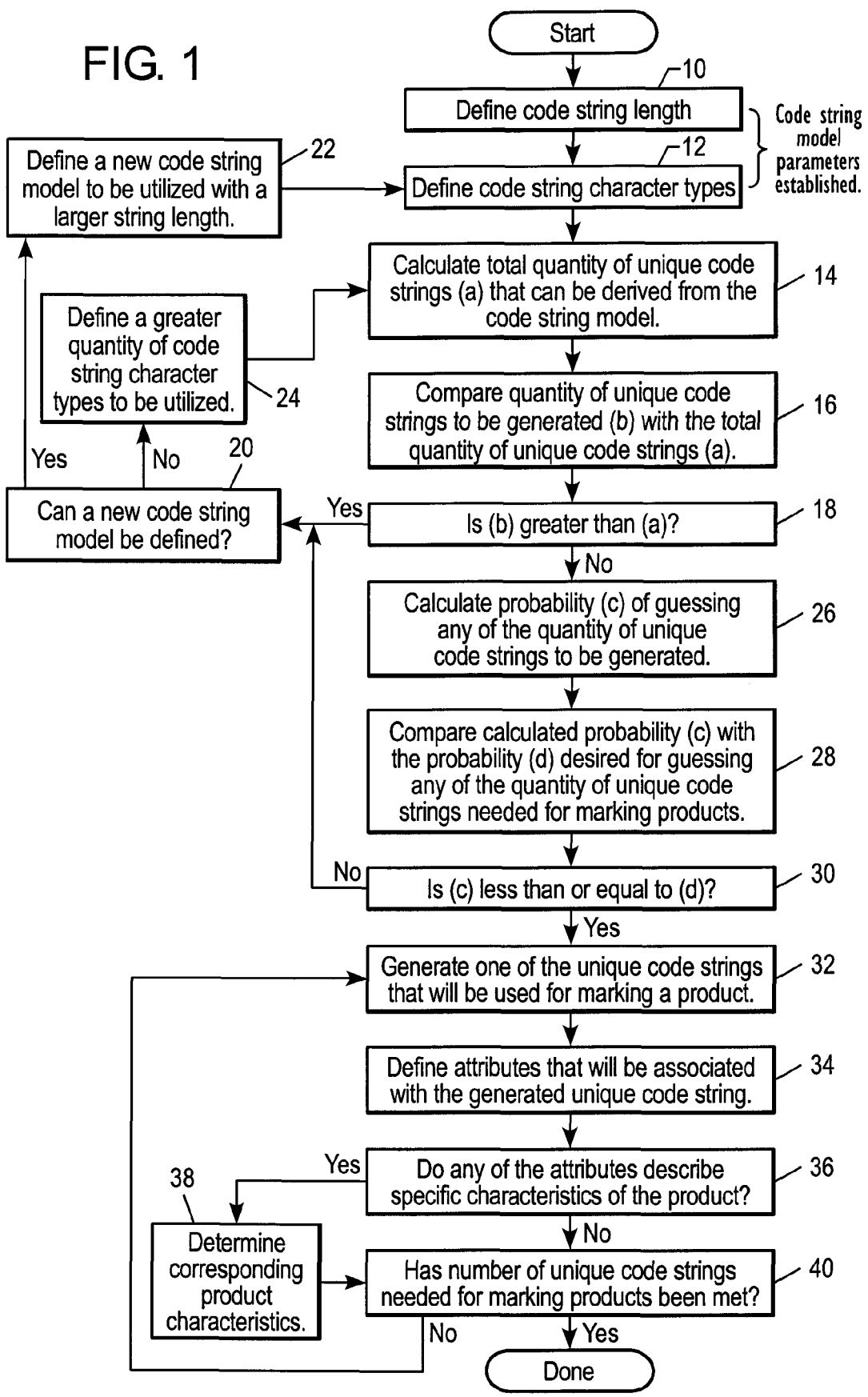
FIG. 1 is a flowchart of a code string generation process in accordance with certain embodiments of the invention.

The following detailed description is to be read with reference to the drawings, in which like elements in different figures have like reference numerals. The drawings, which are not necessarily to scale, may depict selected embodiments, but are not intended to limit the scope of the invention. It will be understood that many of the specific details of the invention incorporating the system illustrated by the drawings could be changed or modified by one of ordinary skill in the art without departing significantly from the spirit of the invention. The system of the invention is designed for use by consumers; however, it is appreciated that the system also may be used by other parties in commerce chains, e.g., retailers, distributors, manufacturers, suppliers, custom clearance organizations, and the like. The system of the invention is designed for use in any vertical market involving products in areas of technology such as electronics, branded product enhancers, aerospace, automotive, and pharmaceutical, as well as products involved in government (US, state, local and foreign) markets.

The anti-counterfeiting system of the present invention contemplates generating a quantity of unique code strings, whereby the unique code strings are derived from a code string model having defined finite parameters. Additionally, the system contemplates marking instantiations of product with the unique code strings, whereby each instantiation is preferably marked with one unique code string and each code string preferably conveys authenticating information regarding the instantiation that the unique code string is marked on. Also, the system contemplates storing these unique code strings and such authenticating information in a database on a secure server. Further, once the instantiations are distributed, the system contemplates using one or more communication devices for entering the unique code strings therein and for communicating via transmission links with the secure server. Consequently, one may use the system to authenticate or track the instantiations in order to prevent confusion of the marked instantiations with counterfeit or contraband items.

The system referenced above mentions generating unique code strings. As such, preferably none of the code strings generated are repeated. When referring to product herein, it is done to indicate a general brand or merchandise line of a manufacturer, while when referring to instantiations of the product, it is done to indicate a solitary example of the product. Although the system referenced above mentions marking instantiations of product, the product may include raw materials, intermediate goods, goods, package modules of goods, and the like without departing from the spirit of the invention. In addition, while it is contemplated that instantiations of product are marked with the unique code strings, it should be appreciated that the code strings could just as well be marked onto tags that are subsequently affixed to the instantiations. As referenced herein, the term tag could include a label, a marker, a sticker, a ticket, or other like items. A related application involves the unique code strings being marked on sealed instantiations. For example, the unique code strings could be marked on film used for sealing instantiations. In doing so, the instantiations, whether being distributed direct from the manufacturer or through a chain of commerce originating from another country, can be secured from counterfeiters. Specifically, counterfeiters may be able to duplicate the film used for sealing, however, the difficulty would lie in duplicating the unique code strings on the film. Further, while it is described that the unique code strings are stored in a database on a secure server, it is contemplated that the database could instead be held on a computer hard drive or other similar processing and storage unit that is operatively coupled to or in communication with a widely accessible network. Finally, while it is mentioned that the unique code strings are entered into communication devices, it should be appreciated that the code strings could be authenticated and tracked in the field using virtually any device that can communicate (hardwire or wireless) with the server, whether this is through the use of a cell phone or pager (where the code is entered into the keypad), through a modem (where the code is entered through typing on the keyboard), or other similar devices.

The security of the anti-counterfeiting system described herein does not reside in keeping secret the manner of how the unique code strings are generated. Instead, the system security resides in the theory of using a substantially small subset of unique code strings in comparison to the total quantity of possible code strings that could be used. In certain preferable embodiments, a code string model is utilized. Due to limitations in code string length and the quantity of marks, symbols, and patterns that may define each character in the code string model, there generally is a limit as to the total quantity of unique code strings that can be derived from the model. For example, a quantity of one-hundred million different unique code strings could be derived from a particular code string model (via different character combinations of the model). However, if only ten thousand of these one-hundred million unique code strings is selected for use (i.e., and generated for product marking), it would be highly unlikely for one to deduce the selected code strings from the total quantity (i.e., set) of code strings that may be derived. In certain preferable embodiments, the "sufficiency" of the system (i.e., the likelihood of guessing any of the subset of unique code strings selected for use) would be no greater than one in eighty million. In quantifying this probability, there would be a greater likelihood of winning a state lottery (i.e., with odds of winning generally being one in seventy-two million) than of guessing any of the subset of possible code strings selected for use. As such, the "sufficiency" of the system would preferably be better than that of the lottery.

As mentioned above, the unique code strings generated and used for product marking are preferably stored in a database on a secure server. In certain preferable embodiments, the secure server is accessed via the Internet by contact with a primary website. While it is contemplated that the primary website, with corresponding URL (Uniform Resource Locator), i.e., world wide web address, enables direct access to the unique code strings via the secure server, it is appreciated that the primary website may alternatively function in shifting people to one of a plurality of secondary websites linked to the primary website. The logic behind this shifting principle is to have each secondary website with its own independent secure server and corresponding database. As such, each secondary website would preferably be used to store the unique code strings for one or more products of the manufacturer. As such, in certain embodiments, each secondary website could use the same unique code strings for authentication and tracking purposes since the code strings for the products would be stored and accessed separately. In certain preferable embodiments, while a person enters or scans the code string on one of the marked instantiations, he would also indicate the product. Consequently, when this information is transmitted to the primary website, a shift is automatically made to one of the secondary websites corresponding to the instantiation previously indicated. In turn, once this information is further transmitted to the corresponding secondary website, the scanned unique code string information is authenticated using the database on the secure server of the secondary website. Thus, there would be virtually no limit as to the number of manufacturers or products that could be supported by the system.

In certain preferable embodiments, the system includes three primary processes. These three processes involve code string generation, code string marking and storing, and code string distribution. The initial process in the system involves code string generation, wherein a subset of unique code strings is generated (to be utilized for future product marking). A flowchart illustrating steps of a preferable embodiment for this initial process is shown in FIG. 1. Steps 10 and 12 of this process involve establishing parameters for a code string model from which all the unique code strings are generated. Initially, a code string length is defined (step 10) for the code string model. In certain preferable embodiments, the code string model is defined as a serial number having a finite code string length. Preferably, the code string length (defined as the quantity of characters defining the code string model) is at least seven, more preferably at least twelve, and perhaps optimally twenty. Next, the character types are defined for the code string model (step 12). While it is contemplated that the characters of the code string model may be defined as any of a variety of marks, symbols, or patterns, in certain preferable embodiments of the invention, each character is defined alphanumerically (i.e., formed of either upper- or lower-case letters of the English alphabet or of numerals zero through nine).

As described above, the system preferably generates only a subset of the total quantity (i.e., set) of unique code strings that could be derived from the code string model. However, the code string model must be defined to accomplish this. This is verified in steps 14 and 16. Initially, the total quantity of unique code strings that could be derived from the code string model is calculated (step 14), as further described below. This quantity is subsequently compared to a quantity of unique code strings to be generated (step 16). If the quantity of unique code strings to be generated is greater than the total quantity of unique code strings that could be derived from the code string model (step 18), the code string model should be modified. Initially, one looks at whether a new code string model can be defined (step 20). If a new code string model can be defined, it is defined with a larger string length of characters (steps 22). If a new code string model cannot be defined, a greater quantity of code string character types is defined for the code string model (step 24). As such, the quantity of unique code strings to be generated is accommodated by the total quantity of unique code strings that could be derived from the code string model.

Before generating the unique code strings, one would preferably want to know the likelihood of a person potentially guessing any of the set of generated serial numbers. This is calculated in step 26, using the equation, $$P=B/(N^D), \quad [1]$$

where P=the probability of guessing any of the unique code strings generated, B=the quantity of unique code strings to be generated, and $N^D$=the total quantity of unique code strings that could be derived from the code string model, where N=the quantity of character types in the code string model and D=the quantity of characters in the code string model. One example using the equation involves generating one hundred million unique code strings to be used for marking products, with each code string having twelve characters, and each character being defined alphanumerically (twenty-six lower case letters, twenty-six upper case letters, and ten numerals). As such, according to Equation 1, the probability of guessing any of the generated code strings would be one hundred million divided by sixty-two to the twelfth power, or about one in thirty-two trillion. Subsequently, in step 28, the calculated probability would be compared with a probability that is desired in using the system. If the desired probability is less than the calculated probability (step 30), either a new code string model would be defined with a greater string length of characters (step 22), or a greater number of code string character types would be defined for the code string model (step 24). As such, the desired probability for guessing any of the generated code strings would be made to fall within the calculated probability of the system.

In preferable embodiments, if both conditions involving (1) the quantity of code strings needed for marking products and (2) the probability desired for guessing any of the quantity of code strings are met, the unique code strings are generated in step 32. As each unique code string is generated in step 32, the code string is subsequently associated with attributes in step 34. Preferably, the attributes define characteristics involving the instantiation of the product to which the unique code string will be marked on or affixed to (via a tag) in the future. Such characteristics may include company (i.e., place of manufacture), product, destination (i.e., customer location), number of scan checks allowed during distribution, time period(s) during which scans can be made, and actions defined in response to a valid code scan for an instantiation of the product. Since some of these attributes may involve information regarding a specific instantiation, such information is determined (steps 36 and 38) prior to the code being placed on the instantiation. Actions defined in response to an invalid code scan may also be associated with the attributes of the unique codes. For example, if a unique code string length is not valid based on the scan, a likely action would be to indicate that a code string is counterfeit. Likewise, if an unique code string has been checked more frequently than necessary, a likely action would be to indicate that the code string is being fraudulently duplicated. Other attributes defining instantiation characteristics may include manufacturing lot number; time, date, and place of manufacture; country entry points for distribution; and any other information that could be important for product identification and tracking purposes. These attributes may be represented alphabetically, numerically, alphanumerically, graphically, or by other like means with the generated code strings. In step 40, the steps of generating the unique code strings and associating attributes to the generated code strings are repeated until all the code strings have been generated.

There are many well-known techniques in the art for randomly generating a subset of unique code strings if provided a code string model having a finite string size (i.e., a defined quantity of characters) and finite character types (i.e., defined quantity of character types). Consequently, the step of generating the unique code strings (step 32) will not be described in any further detail. However, in certain embodiments, the unique code strings that are generated are done so without adherence to any particular algorithm. This is in contrast to many other systems using authentication software, for example, whereby the validity of the unique code string is initially verified through algorithm computation. Instead, the unique code strings herein are primarily validated by being matched to one of the code strings stored in a database located on a secure server. Alternatively, in other certain embodiments, an algorithm may be used to provide an initial validation for the unique code string. One example of such an algorithm that could be utilized is a "checksum" algorithm. Briefly, in using the algorithm, one would take a certain number of characters from the unique code string, perform some algorithmic function with the characters, and check whether the resultant of the function is represented by a certain segment in the unique code string. In using an algorithm in this fashion, one would likely decrease the response time for validating the unique code strings since the entire database would not have to be scanned for the code strings to be found invalid. However, by using such an algorithm, it would also likely increase the probability of guessing the unique code strings because the code strings would be less random.

In certain preferable embodiments, as mentioned above, the unique code strings generated for marking products are defined alphanumerically. While the unique code strings are not generated with the intention to specifically form any known words, it is contemplated that this may occur from time to time. In order to avoid any unique code strings that are randomly generated to form any words that are vulgar or offensive, an algorithm may be additionally utilized in the code string generation process to eliminate any code strings that contain certain designated vulgar or offensive words. Alternatively, the unique code strings could be generated without using any vowels (i.e., using the letters a, e, i, o, and u) so as to not form any words at all via the code string generation. If this is done, an algorithm could likewise be used initially in validating the unique codes, whereby if any scanned codes had vowels, the scanned code string could immediately be identified as counterfeit.

While certain preferable embodiments are described above defining the unique code strings as serial numbers with alphanumeric strings of characters, it is appreciated that the marks, symbols, and patterns suitable for use may also include, without limitation, codes such as UPC symbols, data matrix symbols, graphic symbols such as logos, pictures, images, and the like, encrypted data in textual, numeric, binary, octal, hexadecimal, or the like, or any other data encoding format. Additionally, it should be appreciated that the generation of the unique code strings may be outsourced to a third party. This third party may be a trusted authorized creator or the product manufacturer, and could be located anywhere in the world.

While FIG. 1 and the above description provide certain preferable embodiments for a process of generating unique code strings, it is not intended to limit the invention as such. It is contemplated that there are a variety of ways in which steps could be reconfigured or even discarded without departing from the spirit of the invention. For example, while not being represented in the flowchart of FIG. 1, if a desired probability (for guessing the generated code strings) was given upfront in the process, one could discard steps 14 through 18. As such, after the code string model parameters are defined in steps 10 and 12, the probability (for guessing any of the generated unique code strings) would be calculated in step 26 and compared to the desired probability in step 28. As mentioned above, if the desired probability is less than the calculated probability (step 30), either a new code string model would be defined with a greater string length of characters (step 22), or a greater number of potential character types would be defined for the code string model (step 24). This process would, in turn, be repeated until the desired probability falls within the calculated probability of the system.

In such a scenario where the desired probability (for guessing any of the generated code strings) was given upfront in the process, P could be used as a constant value in Equation 1. In using the code string model parameters to, in turn, define both N and D, the only variable would involve B. Equation 1 could then be modified to produce the following equation, $$B = P \cdot (N^D). \qquad [2]$$

Using Equation 2, one would be able to calculate the maximum number of unique code strings that could be generated while still being within the desired probability (for guessing any of the generated code strings). As such, this would take the place of steps 14 through 18.

Another alternate embodiment for the generating code string process could involve generating all the unique code strings used for marking products in step 32. Subsequently, in certain embodiments, one or more of the unique code strings may be assigned attributes in steps 34 through 38, while the other unique code strings are kept for future use, having no attributes assigned thereto. As such, steps 32 through 38 would be reconfigured, while step 40 would be discarded.

Figure 2:
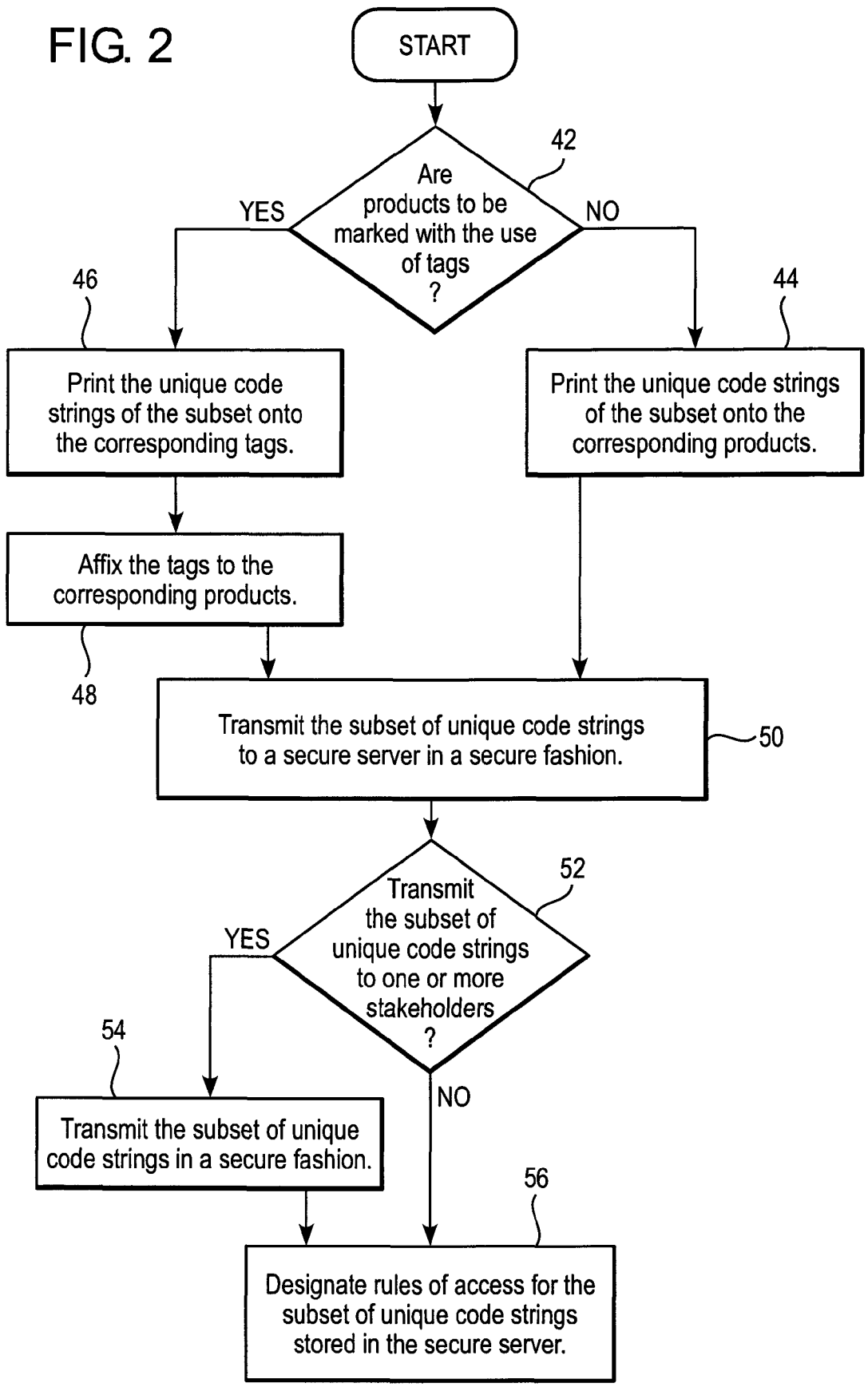
FIG. 2 is a flowchart of a code string marking and storing process in accordance with certain embodiments of the invention.

The intermediate process in the system involves code string marking and storing, wherein the generated unique code strings of the subset are preferably marked onto corresponding instantiations of the product and stored within a database on a secure server. A flowchart illustrating steps of a preferable embodiment for this intermediate process is shown in FIG. 2. While the marking steps precede the storing steps in the flowchart of FIG. 2, it is fully contemplated that the steps could just as well be switched in sequence without departing from the spirit of the invention. As such, the marking and storing steps are intended to be swappable, and the invention should not be limited because of the sequencing of the steps represented in FIG. 2. It should also be appreciated that performance of the intermediate process may be outsourced to a third party. This third party may be a trusted authorized party or the product manufacturer, and could be located anywhere in the world.

After the subset of unique code strings is generated via the initial process (i.e., illustrated in FIG. 1), the code strings are preferably marked onto corresponding instantiations of the product. Initially, in step 42, it is determined whether the product will be marked using tags. If the product is to be marked without using tags, the unique code strings are preferably printed directly on the corresponding instantiations (step 44). Alternatively, if the instantiations are to be marked using tags, the unique code strings are preferably printed onto tags (step 46). Subsequently, each of the tags is affixed to corresponding instantiations (step 48).

In certain embodiments, these tags may be adhesive labels. In other certain embodiments, these tags may include holographic stickers, wherein the unique code strings are embedded within corresponding stickers or within layers. As such, the unique code strings are only visible under certain types of light, allowing for an additional level of security and verification. In other embodiments, these tags may include remotely readable chips that may be scanned, e.g. by a reader transmitting a radio frequency pulse, causing the chip to transmit the unique code back to the reader, where it is displayed or stored.

A related application includes tags including material having magnetic threads that may be permanently encoded. One supplier of such material is Appleton Paper, Inc. (located in Appleton, Wis., U.S.A.). The threads of such material could be encoded the unique code strings. Once the material is dye cut into a label, one ends up with individual code strings.

These strings can then be scanned to determine the code string. Once determined, the code strings can be printed. If the code strings are printed in human readable form, the code string would be easy to type into a keypad of a communication device, i.e., a cellular phone. As such, one would be able to log on to the Internet and verify the code for authentication and routing purposes over a secure server, e.g., attached to an Internet website.

In certain embodiments, if the unique code strings of the subset are printed onto tags or are implemented as tags, the tags may be securely stored prior to their placement on the instantiations. The tags are preferably tamper-resistant, and are difficult to replicate. The unique code strings, and other information if desired, may alternatively be implanted on chips each embedded in corresponding instantiations, if desired. This provides an unobtrusive manner of providing a unique code string that can still be checked or scanned. Additionally, it is contemplated that the product can be marked at any stage of the manufacturing process. While the technique of marking the tags before affixing the tags to the instantiation is described above, it should be appreciated that the tags could just as well be applied to the instantiation before being marked with the unique codes.

In step 50, the subset of unique code strings (and all such attributed information conveyed therefrom) is preferably securely transmitted to a secure server and subsequently stored in a database on the server. As such, the server functions primarily as a storage facility for the subset of unique code strings. However, as described above, it is contemplated that the unique code strings may alternatively be stored in any of a variety of other secured processing and storage devices, so long as they enable secure communications to be made with third parties in regard to the stored code strings. In certain preferable embodiments, the secure server is accessed from a website located on the Internet. The body of information is preferably sent to the server using a secure transmission method such as SSL (Secure Sockets Layer), a VPN (Virtual Private Network), PM (Public Key Infrastructure) encryption, or x.509 digital certificates, so as to prevent the unauthorized access or dissemination of the information. The unique codes are preferably transmitted via an XML (Extensible Markup Language) format document with appropriate tags, or other suitable EDI (Electronic Data Interchange) interface.

As described above, the subset of unique code strings and all such attributed information conveyed therefrom are preferably stored within the database on the secure server. The secure server may be operated by an entity that acts as a service provider or vendor of the system of the invention. Alternatively, the secure server may be maintained by the product manufacturer whose products are being controlled. In step 52, it is determined whether the subset of unique code strings should also be transmitted in secure fashion to stakeholders. The stakeholders could include such parties as the product manufacturer; the distributor, supplier, or retailer of the product; government employees such as Customs Service, the FDA, the Department of Transportation, or law enforcement personnel, as needed; as well as shippers, freight services, or customers and other end users. If the subset of unique code strings is to be transmitted to such stakeholders, as in step 54, the transmission is preferably performed in secure fashion, as described above.

In step 56, rules of access are designated for the generated unique code strings stored in the server. Generally, these rules focus on the access provided to the unique code strings once they are stored in the database on the secure server. Preferably, the rules define the parties that will have access (i.e., the valid or authorized stakeholders) to the server, the type of information that the parties will have access to, and the type of information that can be altered by the parties.

In preferable embodiments, the data regarding the generated unique code strings stored on the server may be accessed via a top level domain or other URL, including the website of the manufacturer, or a service administrator acting as a vendor to the manufacturer. Additionally, the data may be preferably accessed via web access including wireless web access, at any point along the distribution chain for the products, including check points including customs or law enforcement checkpoints, or by an end user seeking to ensure that the instantiation they have purchased or may purchase is an authentic good and not counterfeit. Also, personnel manning checkpoints may be authenticated stakeholders, who may access (read) and change (write) information via server. Further, authentic products may have the appropriate server URL indicated thereon, whereby end users can check the validity of the code strings on the instantiations of the product. The availability of the unique code validating service may also be the subject of an advertising or educational campaign by which consumers of the s expect the URL to be provided, and that the lack of a certain recognizable URL is indicative of a counterfeit article.

As referenced above, the valid stakeholders (i.e., having appropriate security access to the server) may also be preferably authorized, as desired, to make changes to the information as warranted, as well as access the information for viewing only. For example, if a shipment of the product has been stolen, a stakeholder, such as the manufacturer, administrator of the system, or law enforcement agent, may invalidate the applicable unique codes on those stolen instantiations. Intended downstream recipients or holders of the stolen instantiation may be informed, upon inquiry to server, that their instantiation was stolen, and be given information about when it was stolen, if desired by the server administrator. Additionally, a potential purchaser may wish to check a unique code of a instantiation of the product or unique codes from a product shipment to make a determination about the legitimacy of such goods prior to actually paying for or taking delivery of the instantiation in question. Further, the unique codes may also be checked by the manufacturer, when the instantiation is returned for credit, replacement, or repair, in order to prevent the replacement of counterfeit or stolen goods with "laundered" genuine replacement product.

Figure 3:
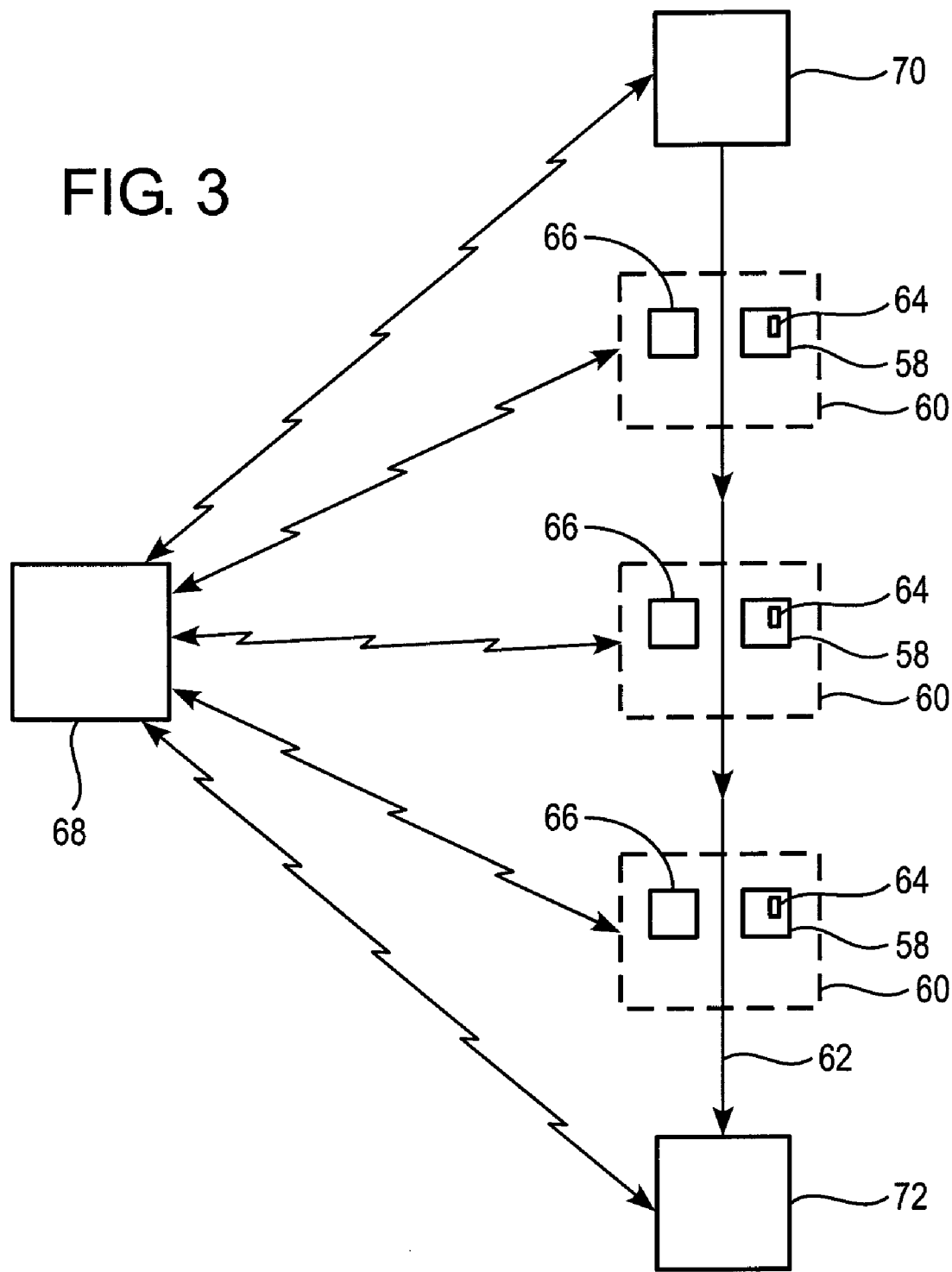
FIG. 3 is a block diagram illustrating a code string distribution process in accordance with certain embodiments of the invention.

The final process in the system involves code string distribution, wherein the instantiations of the product (marked with the unique code strings) are distributed, whether it involves being distributed within a warehouse in anticipation of shipment; or within the stream of commerce to a distributor, supplier, retailer, or customer; or otherwise. During this distribution, the unique code strings on the instantiations are read or scanned using a communication device, and this information is transmitted to the secure server. The server accepts the transmitted information, interfaces with the database held therein, and generally returns a valid or invalid message to the communication device regarding authentication of the instantiation. In addition, messages may also be sent from the server regarding product tracking. A block diagram illustrating a certain preferable embodiment of this final process is shown in FIG. 3.

In certain preferable embodiments, instantiations 58 of the product (or alternatively, product shipments) are authenticated at periodic check points 60 along their chain of distribution 62. As mentioned above, the instantiations 58 are authenticated at these check points 60 by entering or scanning the unique code strings 64 located thereon with communication devices 66. Preferably, the communication devices 66 are equipped to cooperate with a secure server 68 and are generally located at these check points 60 remote from the server 68. As described above, the instantiations 58 can be marked directly, or one or more tags (not shown) can be marked and affixed permanently to the instantiations 58.

In certain embodiments, the code strings 64 are automatically entered into the communication devices 66. This automatic entry is preferably accomplished if the communication devices 66 have field readers, e.g., laser scanners, which generally scan the code strings 64 using an appropriate wavelength of light. In other certain embodiments, the code strings 64 are manually entered into the communication devices 66. This manual entry is preferably accomplished if the communication devices 66 have a keypad of the device, which is used to manually enter the string codes 64 therein. Information gathered at the check points 60, either automatically or manually, is subsequently transmitted from the communication devices 66 to the secure server 30 in order to verify that the instantiations 58 are authentic. In addition, with the information collected, verification can also be made that the instantiations 58 are being rightfully distributed. Generally, the total image of the unique code string 64, or an ASCII string representing the unique code string 64 is transmitted from the communication device 66 to the server 68. In preferred embodiments, the server 68 receives the data from the field reader 66, decodes the data, and searches the database (not shown) to validate the data. Once validated, the server 68 sends a "valid" signal back to the field reader 66 and any other pertinent information pertaining to the instantiation 58. Conversely, if the marked instantiation 58 is counterfeit or has been received at the wrong point of final distribution, an "invalid" signal is transmitted and displayed on the field reader 66. One authenticating use of the system is for customs agencies and clearing houses around the world for quick and easy inspection of products entering a country, thus facilitating detection of counterfeit and misdirected articles. Such checking can lead to the discovery of any wrongful or illegal smuggling of products into countries.

In preferred embodiments, a track and trace system is also implemented in order to monitor the integrity of supply chains and to prevent and detect product diversion. Such systems are generally known. These systems, similar to those of expedited delivery services such as Federal Express, allow a user, at any time (subject to some amount of delay), to locate where a parcel or other item is in the chain of delivery to the destination. Similarly, in the context of FIG. 3, a track and trace system allows a shipper 70, or recipient 72 to locate where a product shipment is (or where a particular instantiation 58 is), and whether it has been diverted from the chain of distribution 62, for example, by theft, or importation to a country for which it was not intended, i.e., a gray market good or parallel import. The unique code strings 64 may be used as the ID for such product tracking purposes. For example, as mentioned above, at different check points 60 of the distribution chain 62, the unique code string on one of the instantiations 58 could be scanned to authenticate the instantiation 58, but also, to verify correct tracking for the product shipment. By checking or scanning the unique code strings 64 at these check points 60, the instantiation's location is sent to the server 68 and recorded. As such, the instantiation's location can also be compared against the expected or intended location at that time. The recording of this information onto the server 68 forms an audit trail for the shipper 70 and recipient 72 who wish to track the instantiation 58 along the distribution chain 24. This information can further be used to determine problem areas of logistics, such as supply bottlenecks or unscrupulous business associates.

When using field readers for the communication device 66, the unique code strings 64 are preferably read by illumination with a required IR or UV source. Another possible option of reading the unique code strings 64 involves using radio frequency transmission. These techniques of scanning data are both well known in the art. Regardless of the available technology, e.g., optical, radio frequency, etc., the information is captured by the reader and then downloaded, preferably to a PC with a dial up modem that can connect to the server 68 for code string authentication and tracking purposes. As described above, the code strings 64 are transmitted to the server 68, and are compared to code strings stored in a database. This database of values, generally a "look up" table, provides an arrangement of the generated unique code strings 64 that were placed on the products 58. Preferably, as mentioned above, the database is also arranged to provide additional information regarding the instantiations 58 attributed to the unique code strings 64. For example, the database could store information indicative of product origin. As such, if the marking on the instantiation 58 is counterfeit or contraband, there is no basis by which the counterfeit manufacturer or the smuggler would know the appropriate origin and destination data, thereby increasing the possibilities of detecting counterfeit and contraband goods. Therefore, authentication of the instantiation 58 can preferably be determined through confirmation of the code string 64 or through confirmation of specific data concerning the instantiation 58.

An added feature of the system is the real-time nature of validation. Piracy, counterfeiting, and/or diversion commonly occur at the plant or just beyond its gates. The present system allows the functionality of immediate interception on the yard, or the backdoor of the plant. Using one of the communication devices, as described above, inspection can be performed at the plant gate to verify that instantiations going out of the plant gates are authentic, marked, and correctly routed. As a further example, a communication device 66 with field reader may be used to "instantly" authenticate instantiations 58 at the time of their receipt or sale, or during processing. Immediately after the instantiations 58 are marked with the unique code strings 64, they can be read or scanned, which can be used to determine the validity of the instantiations 58 through authentication of the code strings 64 via the database on the secure server 68. The only lag time is that which is required to transmit from a field or point of sale reader to the server 68 then back to the communication device 66 to obtain validation.

In certain embodiments of the invention, the communication between the communication devices 66 and the server 68 is preferably done over a network. In particular, the devices 66 include a communication interface that establishes a communication link with a communication interface in the server over the network. As such, query signals from the devices 66 and responses from the server 68 can be communicated over the network. The network may be any network. The network may comprise, for example, a public switched telephone network, a cellular telephone network, a local area network, a wide area network, a global computer network such as the Internet, an integrated services digital network, or the like. In some venues in which the unique code strings 64 may be deployed on instantiations 58, the venue may include a dedicated security network or a private building maintenance network. Either may serve as the network. The network may include hard-wired electrical or optical communication links, wireless links, or a combination of both.

Many examples of communication techniques between the communication devices 66 and the server 68 may be contemplated, and the invention should not be limited to the techniques explicitly described. Communication may be based upon optical communication links, magnetic communication links, infrared communication links, or visual status change detectors. Furthermore, radio frequency has been described, but the invention is not limited to the techniques explicitly described. A cellular telephone link, as mentioned above, may employ any recognized communication protocol, such as code division multiple access (CDMA), Global System for Mobile Communications (GSM), or General Packet Radio Service (GPRS).

Moreover, the invention includes software to carry out many of the storing and comparing techniques of the database and described herein. The invention may be embodied as a computer-readable medium that includes instructions for causing a programmable processor to carry out the methods described above. A "computer-readable medium" includes but is not limited to read-only memory, flash memory and a magnetic or optical storage medium. The instructions may be implemented as one or more software modules, which may be executed by themselves or in combination with other software. The instructions and the media are not necessarily associated with any particular processor or other apparatus, but may be carried out by various general-purpose or specialized machines. The instructions may be distributed among two or more media and may be executed by two or more machines. The machines may be coupled to one another directly, or may be coupled through a network.

Figure 4:
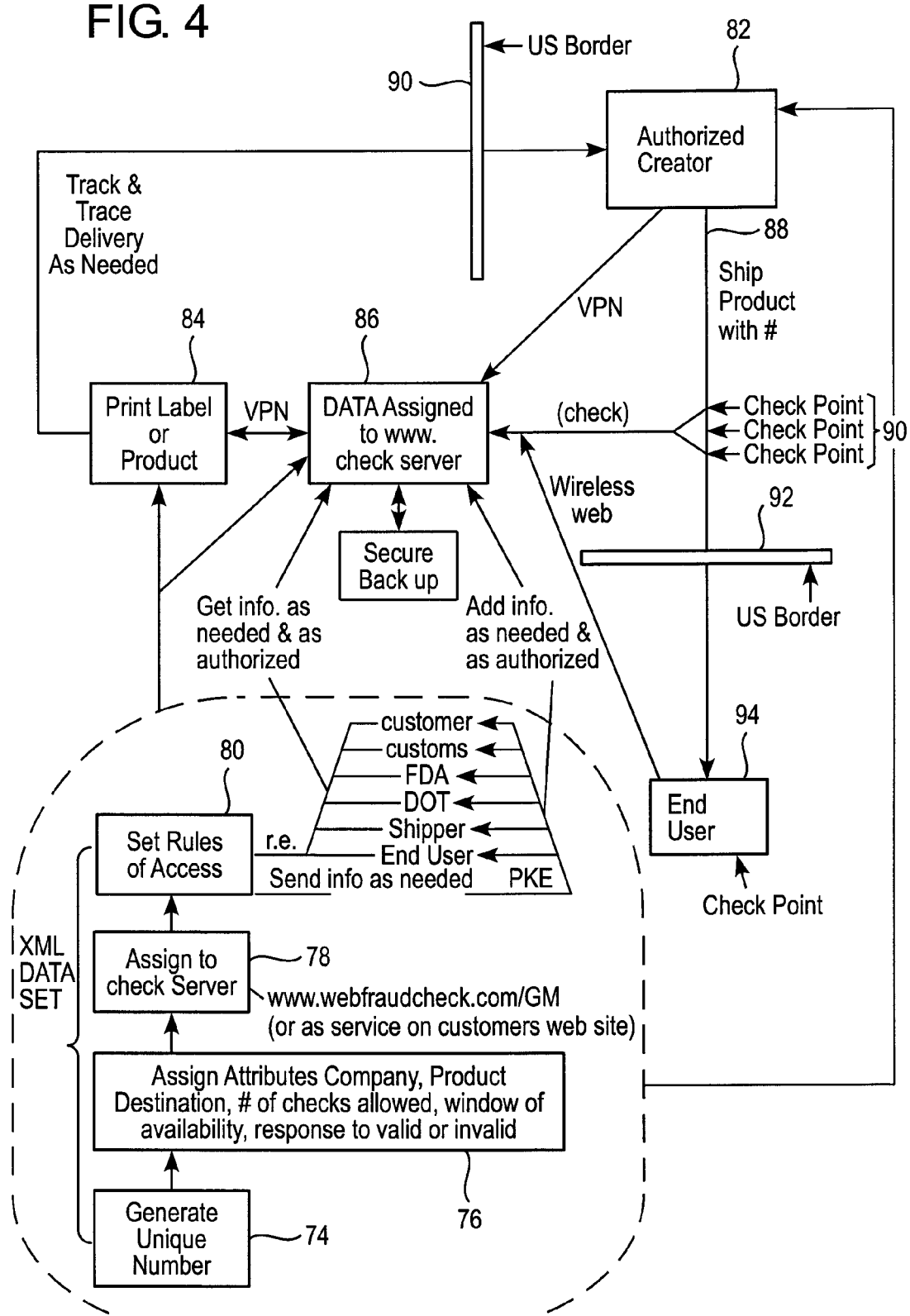
FIG. 4 is a block diagram illustrating a system process in accordance with certain embodiments of the invention.

The system process of the invention in accordance with certain embodiments of the invention is shown in FIG. 4. Generally, a block diagram is illustrated to represent the three primary processes of the system described above. Initially, unique code strings are generated at 74. In turn, the unique code strings that were generated are assigned attributes at 76. Next, the unique code strings are assigned to a server at 78. As such, rules of access are defined at 80. As, shown, these unique code strings can then be sent to the authorized creator at 82, the label or product printing area at 84, or to the server at 86. If the unique code strings were sent to the authorized creator at 82, the authorized creator could mark the code strings on instantiations, send the code strings to the server at 86 for storage, and then ship the marked product along a chain of distribution at 88. If the unique code strings are sent to the label or product printing area at 84, the code strings can be marked on instantiations and subsequently sent to the server at 86 for storage. Then, the marked product could be sent to the authorized creator at 82. Alternatively, if the unique code strings are transmitted to the server at 86, the unique code strings would be subsequently sent to the label or product printing area at 84 for marking product. From the label or product printing area at 84, the marked product would be sent to the authorized creator at 82. In certain embodiments, the marked product may be sent into the United States (indicated by the US Border at 90) from another country. As such, the authorized creator at 82 could track and trace the marked product (as described above) during the transit time for the marked product from 82 to 84.

Once marked product arrives at the authorized creator at 82, the marked product 82 could be authenticated through contact with the server 86. Subsequently, the marked product could be shipped along the chain of commerce 88. As shown, while the product is sent along the chain 88, it encounters a number of check points 90, at each of which, the marked instantiations can be authenticated and the routing of the marked instantiations can be verified through contact with the server at 86. The shipment of marked product being sent along the chain of commerce 88 may be sent into another country from the United States (indicated by the US Border at 92). As such, the authorized creator at 82 could track and trace the marked product (as described above) during the transit time for the marked product from 82 to the end user at 94. Once received by the end user at 94, the marked product can be authenticated again through contact with the server at 86.

While a preferred embodiment of the present invention has been described, it should be understood that various changes, adaptations, and modifications may be made therein without departing from the spirit of the invention and the scope of the appended claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for authenticating one or more instantiations of a product comprising:
    a plurality of instantiations of a product, each of the plurality of instantiations being marked with a unique code string selected from a subset of unique code strings that is derived from a code string model having finite parameters of code string length and code string character types, the finite parameters defining the total quantity of unique code strings, a size B of a subset of unique code strings of a total quantity of unique code strings is selected based on the equation $B=P*(N^D)$, where P is a probability of guessing a code string of a subset of unique code strings, N is a quantity of the finite parameters of a code string length, D is a quantity of code string character types, and $N^D$ is the total quantity of unique code strings;
    one or more secure servers each having a database, one database storing the subset of unique code strings therein;
    a communication device that receives an entry therein of one of the certain quantity of unique code strings marked on or affixed to one instantiation and transmits an inquiry signal containing the one unique code string to one of the one or more secure servers,
    wherein the one secure server receives the inquiry signal, searches the one database thereon to validate the authenticity of the one unique code string, and transmits a return signal to the communication device regarding validation of the authenticity of the one instantiation, and
    wherein a network links the one or more secure servers to the communication device.

2. The system of claim 1, wherein the code string model comprises a serial number, wherein the finite parameters include having at least seven characters and having each of the characters be defined alphanumerically.

3. The system of claim 1, wherein the communication device includes a keypad used for manual entry of the one unique code string.

4. The system of claim 1, wherein the communication device is a cellular phone.

5. The system of claim 1, wherein the network comprises the Internet, wherein the Internet includes a plurality of distinct Internet websites, and wherein each of the one or more secure servers is attached to one of the plurality of distinct Internet websites, wherein each of the distinct Internet websites attached to the one or more secure servers corresponds to a distinct product.

6. The system of claim 5, wherein the Internet includes an intermediary Internet website linked to each of the distinct Internet websites attached to the one or more secure servers, wherein the intermediary Internet website automatically shifts the inquiry signal from the communication device to one of the plurality of distinct Internet websites to which the one secure server is attached, provided the one distinct Internet website corresponds to the product of the one instantiation.

7. The system of claim 1, wherein the communication device comprises a laser scanner.

8. The system of claim 1, wherein unique code strings of the subset of unique code strings not marked on one of the plurality of instantiations of the product are stored in the one secure server for future use.

9. The system of claim 1, wherein each of the subset of unique code strings is marked on or affixed to a tag.

10. The system of claim 1, wherein each of the subset of unique code strings is embedded within layers of a tag, the tag being a holographic compilation.

11. The system of claim 1, wherein each of the subset of unique code strings is programmed in a radio frequency tag.

12. The system of claim 1, wherein each of the subset of unique code strings is encoded within threads of a tag.

13. The system of claim 1, wherein the communication device comprises a field reader, wherein the field reader scans the one unique code string, encodes the scanned unique code string into a machine-readable format, and transmits the encoded unique code string to the one secure server, and wherein the one secure server is decodes the encoded unique code string to reveal the scanned unique code string.

14. A system for authenticating one or more instantiations of a product comprising:
    a plurality of instantiations of a product, each of the plurality of instantiations being marked with a unique code string selected from a subset of unique code strings that is derived from a code string model having finite parameters of code string length and code string character types, the finite parameters defining the total quantity of unique code strings, a quantity of the finite parameters of code string length N and a quantity of code string character types D are selected based on the equations $P=B/(N^D)$ and $P \leq X$, wherein P is the probability of guessing any code string of a subset of unique code strings, B is a size of the subset of unique code strings, $N^D$ is a total quantity of unique code strings and X is a user-selectable probability of guessing any code string of the subset of unique code strings;

one or more secure servers each having a database, one database storing the subset of unique code strings therein;

a communication device that receives an entry therein of one of the certain quantity of unique code strings marked on or affixed to one instantiation and transmits an inquiry signal containing the one unique code string to one of the one or more secure servers, wherein the one secure server receives the inquiry signal, searches the one database thereon to validate the authenticity of the one unique code string, and transmits a return signal to the communication device regarding validation of the authenticity of the one instantiation, and wherein a network links the one or more secure servers to the communication device.

15. The system of claim 14, wherein the code string model comprises a serial number, wherein the finite parameters include having at least seven characters and having each of the characters be defined alphanumerically.

16. The system of claim 14, wherein the communication device includes a keypad used for manual entry of the one unique code string.

17. The system of claim 14, wherein the communication device is a cellular phone.

18. The system of claim 14, wherein the network comprises the Internet, wherein the Internet includes a plurality of distinct Internet websites, and wherein each of the one or more secure servers is attached to one of the plurality of distinct Internet websites, wherein each of the distinct Internet websites attached to the one or more secure servers corresponds to a distinct product.

19. The system of claim 18, wherein the Internet includes an intermediary Internet website linked to each of the distinct Internet websites attached to the one or more secure servers, wherein the intermediary Internet website automatically shifts the inquiry signal from the communication device to one of the plurality of distinct Internet websites to which the one secure server is attached, provided the one distinct Internet website corresponds to the product of the one instantiation.

20. The system of claim 14, wherein the communication device comprises a laser scanner.

21. The system of claim 14, wherein unique code strings of the subset of unique code strings not marked on one of the plurality of instantiations of the product are stored in the one secure server for future use.

22. The system of claim 14, wherein each of the subset of unique code strings is marked on or affixed to a tag.

23. The system of claim 14, wherein each of the subset of unique code strings is embedded within layers of a tag, the tag being a holographic compilation.

24. The system of claim 14, wherein each of the subset of unique code strings is programmed in a radio frequency tag.

25. The system of claim 14, wherein each of the subset of unique code strings is encoded within threads of a tag.

26. The system of claim 14, wherein the communication device comprises a field reader, wherein the field reader scans the one unique code string, encodes the scanned unique code string into a machine-readable format, and transmits the encoded unique code string to the one secure server, and wherein the one secure server is decodes the encoded unique code string to reveal the scanned unique code string.

27. A method for authenticating one or more instantiations of a product comprising:

generating a subset of unique codes strings and marking each of a plurality of instantiations of a product with a unique code string of the subset of unique code strings, the subset of unique code strings derived from a code string model having finite parameters of code string length and code string character types, the finite parameters defining the total quantity of unique code strings, a size B of a subset of unique code strings of a total quantity of unique code strings is selected based on the equation $B=P*(N^D)$, where P is a probability of guessing a code string of a subset of unique code strings, N is a quantity of the finite parameters of a code string length, D is a quantity of code string character types, and $N^D$ is the total quantity of unique code strings;

storing the subset of unique code strings in a database of one or more secure servers;

receiving, by one of the secure servers from a communication device, the inquiry signal containing one of the subset of unique code strings marked on or affixed to one instantiation;

searching, by the one secure server, the database to validate the authenticity of the one unique code string; and transmitting, by the one secure server to the communication device, a return signal to the communication device regarding validation of the authenticity of the one instantiation, wherein a network links the one or more secure servers to the communication device.

28. A method for authenticating one or more instantiations of a product comprising:

generating a subset of unique code strings and marking each of a plurality of instantiations of a product with a code string of the subset of unique code strings, the subset of unique code strings derived from a code string model having finite parameters of code string length and code string character types, the finite parameters defining the total quantity of unique code strings, a quantity of the finite parameters of code string length N and a quantity of code string character types D are selected based on the equations $P=B/(N^D)$ and $P \leq X$, wherein P is the probability of guessing any code string of a subset of unique code strings, B is a size of the subset of unique code strings, $N^D$ is a total quantity of unique code strings and X is a user-selectable probability of guessing any code string of the subset of unique code strings;

storing the subset of unique code strings in a database of one or more secure servers;

receiving, by one of the secure servers from a communication device, the inquiry signal containing one of the subset of unique code strings marked on or affixed to one instantiation;

searching, by the one secure server, the database to validate the authenticity of the one unique code string; and transmitting, by the one secure server to the communication device, a return signal to the communication device regarding validation of the authenticity of the one instantiation, wherein a network links the one or more secure servers to the communication device.

* * * * *